(12) United States Patent
Groves

(10) Patent No.: US 6,638,000 B2
(45) Date of Patent: Oct. 28, 2003

(54) BICYCLE LIFT FOR A VEHICLE ROOF RACK

(75) Inventor: Jamie Christopher Groves, Walled Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/682,222

(22) Filed: Aug. 8, 2001

(65) Prior Publication Data

US 2003/0029896 A1 Feb. 13, 2003

(51) Int. Cl.[7] .................................................. B60R 9/04
(52) U.S. Cl. ..................... 414/462; 224/321; 224/924
(58) Field of Search ........................... 211/17; 224/309, 224/310, 321, 323, 329, 331, 924; 414/462

(56) References Cited

U.S. PATENT DOCUMENTS

| | | | | |
|---|---|---|---|---|
| 3,720,334 A | * | 3/1973 | Permut et al. | |
| 3,720,358 A | | 3/1973 | McIntire | |
| 4,887,754 A | * | 12/1989 | Boyer et al. | ................. 224/319 |
| 5,360,150 A | * | 11/1994 | Praz | ............................ 224/310 |
| 5,360,151 A | * | 11/1994 | Fine | ............................. 224/310 |
| 5,421,495 A | * | 6/1995 | Bubik et al. | .......... 224/43.03 B |
| 5,438,780 A | | 8/1995 | Winner | |
| 5,474,189 A | | 12/1995 | Peterson | |
| 5,709,521 A | * | 1/1998 | Glass et al. | .................. 414/462 |
| 5,827,036 A | * | 10/1998 | Steffes et al. | ................ 414/462 |

* cited by examiner

*Primary Examiner*—Janice L. Krizek
(74) *Attorney, Agent, or Firm*—Gigette M. Bejin

(57) ABSTRACT

A system and mechanism for lifting and lowering bicycles onto the roof of an automobile or other vehicle. A lift arm containing support brackets for holding the bicycle is fixedly attached to a rotatable shaft member positioned on the roof of the vehicle. The shaft member is secured to a bearing member at one end and a gear set mechanism at the opposite end. A crank arm member or motorized mechanism is utilized to operate the gear mechanism and rotate the shaft member. Rotation of the shaft member in turn rotates the lift arm member and lifts and lowers the bicycle onto and off from the roof of the vehicle. Support members for holding the handlebar and seat of the bicycle are attached to the lift arm member for securing the bicycle to it. When the bicycle is in position on the roof of the vehicle, additional bracket members secure the wheels to the vehicle.

21 Claims, 6 Drawing Sheets

BICYCLE LIFT FOR A VEHICLE ROOF RACK

BACKGROUND OF INVENTION

The present invention relates to bicycle carriers for attachment to the rooftops of automobiles and other vehicles.

There are numerous known carrying structures for supporting and carrying bicycles on vehicles. As bicycling has become more attractive today, these structures have developed for transporting bicycles to and from riding locations. Some of these structures allow the bicycle to be positioned and carried on the front or rear bumpers of the vehicles, on the rear sloping hatchback of some vehicles, or on the roof structure of the vehicles. Some of these structures allow positioning of the entire bicycle, while others require the bicycle to be partially disassembled, for example with one of the wheels removed.

Some of the rooftop bicycle carrier devices are compatible with conventional rooftop carrier racks that typically are provided as original equipment on some vehicles, such as sport utility vehicles (SUVs) and station wagons. Other carrier structures and systems are independent and attach separately to the vehicle or roof structure.

The lifting, powering, and securing of bicycles on rooftop devices can be a difficult and time-consuming task. The bicycles are often heavy and awkward to easily lift and position on rooftops. In view of this difficulty, there is a need for an improved device and system which allows loading and carrying of bicycles in an easier and more efficient manner.

SUMMARY OF INVENTION

The present invention provides a device and system for lifting and lowering bicycles onto vehicle roof-mounted racks. The invention includes a crank member, a gear set, a shaft, and a lifting arm, and can be utilized independently or together with an existing rooftop carrier. The bicycle is attached to a support structure on the lifting arm which in turn is attached to a rotatable shaft member situated on the roof of the vehicle. The gear set is positioned on the end of the shaft and is operable by a manual or motor-operated crank mechanism. A gear reduction can be positioned in the gear set allowing rotation of the lifting arm and thus movement of the bicycle from the ground to the roof of the vehicle in an easy and efficient manner.

In use, the user attaches and secures the bicycle to the support structure on the lifting arm. Turning of the crank, either manually or by a motorized mechanism, raises the bicycle until it is positioned above the roof of the vehicle. The wheels of the bicycle are then secured to the rooftop holding the bicycle securely in position.

With sufficient gear reduction, a fifth percentile female can operate the system and lift a 30-pound bicycle without undue strain or effort. Preferably, a set of bevel gears are provided in the gear set together with a worm gear member. The worm gear is operatively connected to the shaft which results in articulation of the lifting arm. The worm gear also prevents the shaft and lift arm from slipping in the opposite direction.

DETAILED DESCRIPTION

The present invention relates to a mechanism and system designed to lift and remove a bicycle between the ground and the rooftop of an automobile or other vehicle. The system generally consists of a shaft connected to a roof rack or other structure positioned on the roof of the vehicle. A lifting arm is attached to the shaft member, and the shaft is adapted to be rotated by a hard or motorized crank mechanism. A reduction gear mechanism is preferably positioned on the end of the shaft to allow ease of rotation of the shaft member and thus ease of lifting and lowering the bicycle from the ground to the roof and vice versa.

Although preferred embodiments of the present invention are specifically illustrated and described herein, it is to be understood that various alternatives and embodiments of the structure in which the present invention is incorporated can be provided in accordance with the skill of persons of ordinary skill in the art. For example, numerous alternative devices and mechanisms can be used to secure a bicycle to the lift arm member. Also, various gear sets and gear reduction mechanisms can be utilized with the present invention. Further, the cranking mechanism can be either manual or motorized and can have any conventional structure and operation. In addition, the structure for attaching the lift arm to the shaft and for attaching the shaft member to the roof of the vehicle can be modified or changed in accordance with the desires of persons or ordinary skill in the art. Finally, the members or devices for securing the bicycle to the rooftop rack structure once the bicycle is positioned on the roof can also be of various conventional types.

Figure 1:
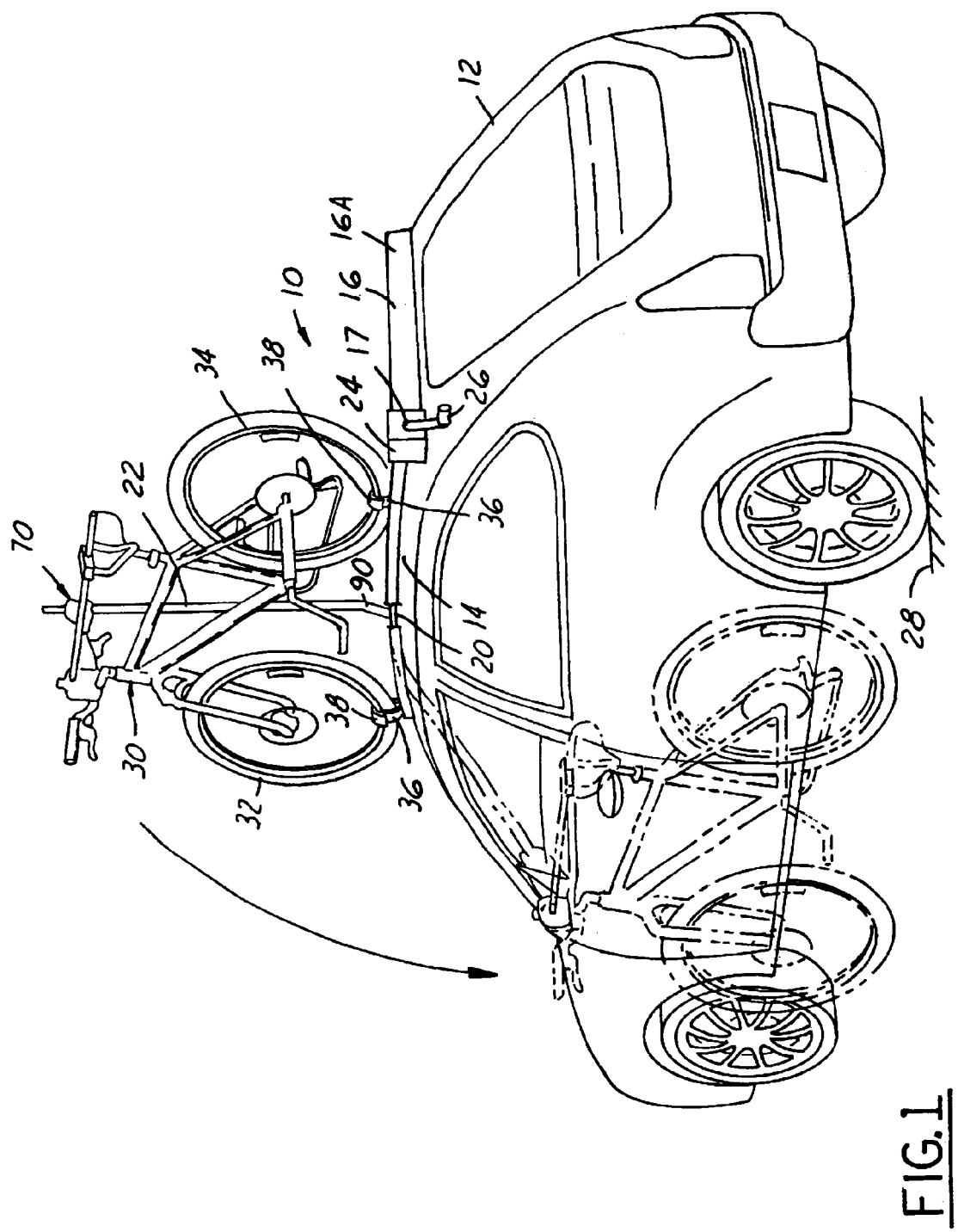
FIG. 1 schematically illustrates the present invention.
Figure 2:
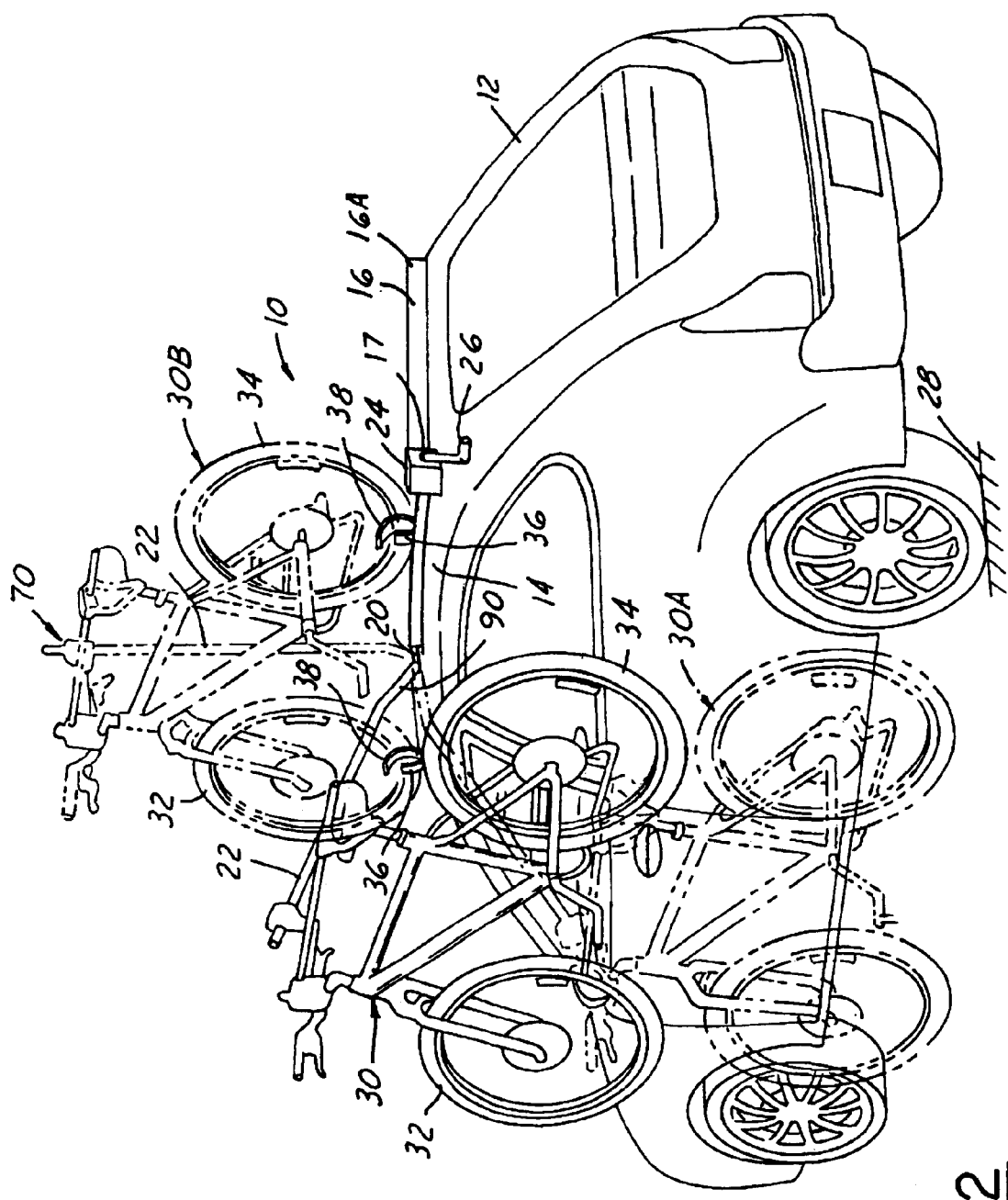
FIG. 2 schematically illustrates the operation of the present invention in lifting and positioning a bicycle on the roof of a vehicle.

FIGS. 1 and 2 illustrate use of the present invention on an automotive-type vehicle. It is understood, of course, that the present invention can be used with any type of vehicle, such as a sport utility vehicle (SUV), hatchback vehicle, station wagon, or the like. The lifting and placement system is generally referred to by the reference numeral 10 in the drawings. The system 10 is shown in use relative to a vehicle 12. The system is positioned on the roof 14 of the vehicle and is either included with or attached to a roof rack structure 16 positioned on the roof of the vehicle.

As shown in FIGS. 1 and 2, the present invention generally comprises a rotatable shaft member 20 positioned on the roof or rooftop of the vehicle. A lift arm member 22 is fixedly attached to the shaft member and rotatable therewith. A gear set 24 is provided on one end of the shaft member and the gear set is operated by a crank member 26.

As shown in FIGS. 1 and 2, the system 10 allows lifting and lowering of a bicycle 30 from the ground 28 to the roof of the vehicle. In this regard, the bicycle 30 is shown in phantom positions 30A and 30B when the bicycle is positioned on the ground and on the roof of the vehicle, respectively, in FIG. 2. In this regard, when the bicycle is positioned on the roof of the vehicle, the wheels 32 and 34 are secured in U-shaped bracket members 36 which are positioned on the roof rack or other structure on the roof of the vehicle. Releasable strap members 38 attached to one side of the U-shaped brackets are adapted to be secured over the rims of the bicycle wheels and attached to the opposite side of the U-shaped bracket in order to hold the bicycle in place on the roof of the vehicle once it is positioned thereon. In order to accommodate bicycles of various sizes, the U-shaped brackets 36 are longitudinally adjustable on the roof rack structure 16.

Preferably, the present invention is included as part of a total roof rack type accessory package for the roof of a vehicle, such as a SUV or other off-road vehicle. In this regard, the shaft member can be built into one or both sides of a side rail member (not shown) on the roof rack structure. The gear set can be built into one of the corners of a rear cross member 16A on the roof rack structure 16 and a small opening 17 can be provided for insertion of the crank member or handle 26 (or rotating motorized connecting member) in order to operate the gear set and rotate the shaft and lift arm member. Also, the bearing 42 or other rotatable mechanism carrying and positioning the opposite end of the shaft member can also be built into a roof rack mechanism.

Figure 3:
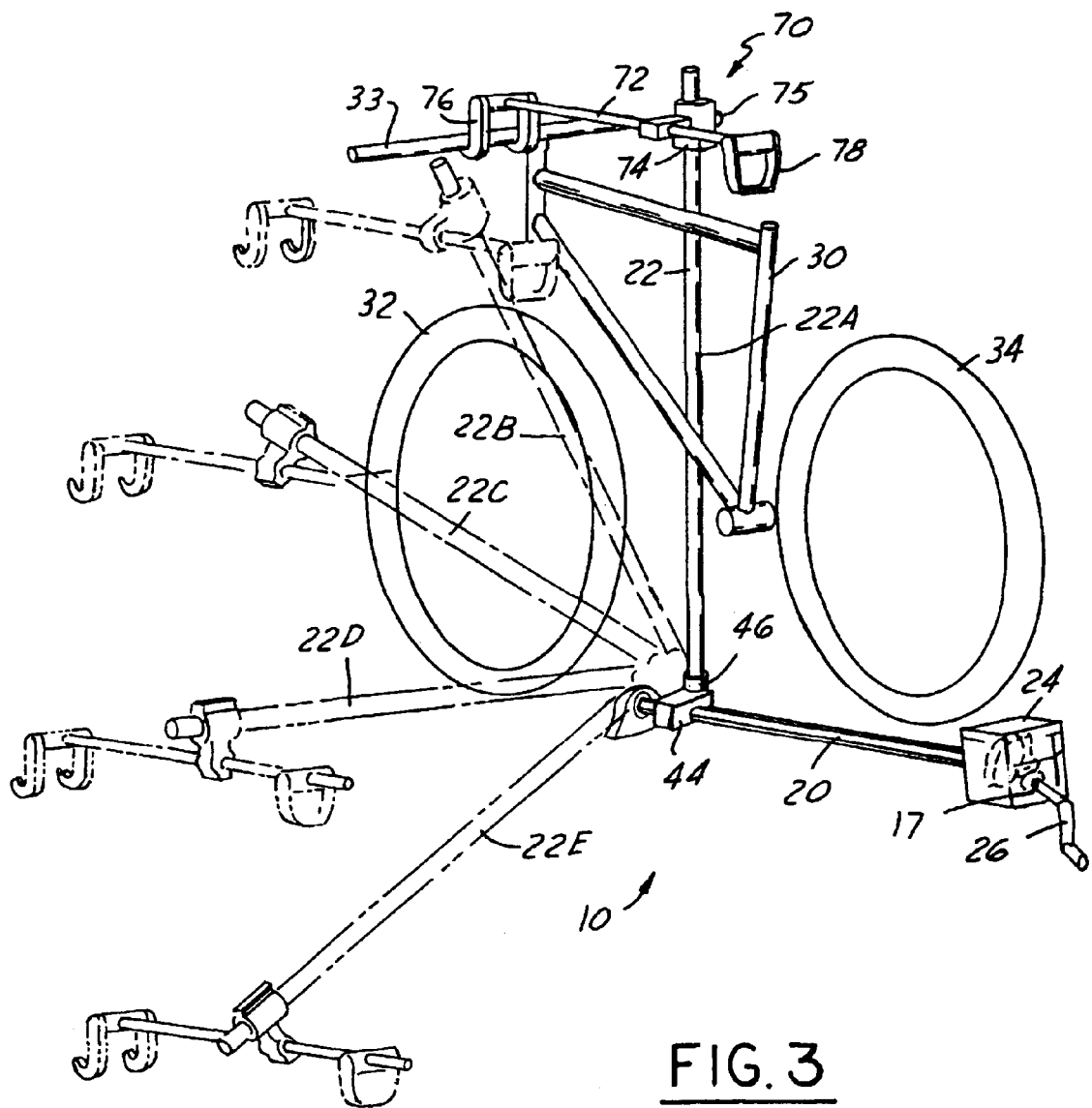
FIG. 3 is a schematic perspective view illustrating the operation of the unique lifting mechanism in accordance with the present invention.
Figure 4:
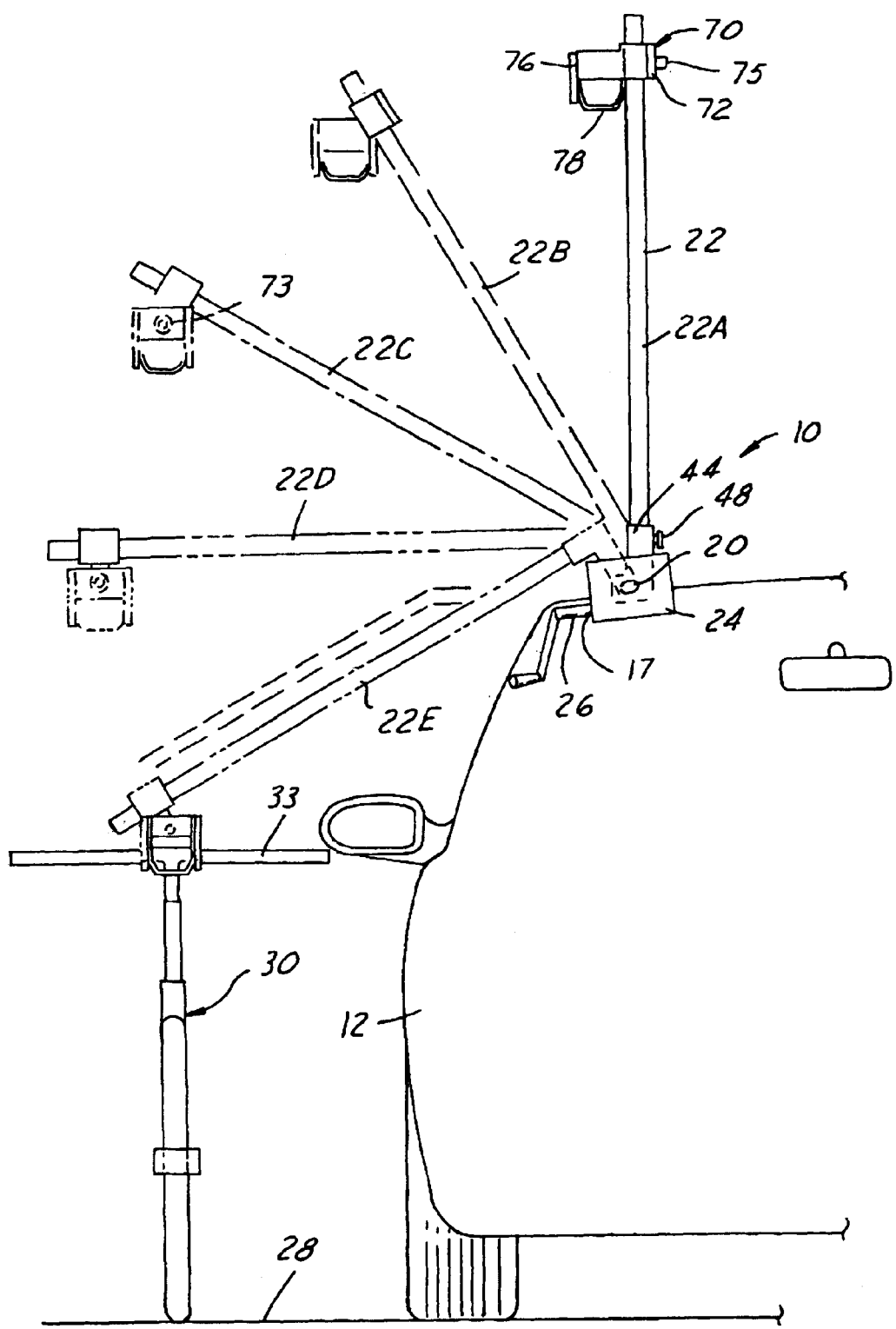
FIG. 4 is another schematic view of the present invention showing the various stages of the lifting mechanism relative to lifting and lowering a bicycle from the ground to the roof of the vehicle.

Various details and structure of the operation of the present inventive bicycle lifting system 10 is shown in FIGS. 3–7. In this regard, FIGS. 3 and 4 are schematic and elevational views, respectively, showing various positions of the lift arm member 22 as it lifts the bicycle from the ground to the roof of the vehicle 12 or vice versa. In FIGS. 3 and 4, the lift arm member 22 is shown in five of the various positions 22A–22E as it rotates from the most vertically upward position 22A to the most horizontally downward position 22E where the bicycle is positioned on the ground 28.

The rotatable shaft member 20 is preferably a solid metal shaft having a round or hexagonal cross-section. A hexagonal shape, as shown in FIG. 5, allows ease of attachment of the shaft to the gear set 24 and supporting bearing mechanism 42.

The lift arm member 22 also preferably is a solid or tubular member and can have either a round or other conventional cross-sectional size and shape. The lift arm member 22 is releasably positioned in an L-shaped bracket member 44 which is securely attached to the shaft member 20. As best shown in FIG. 5, the L-shaped bracket member 44 has a socket member which allows the lower end of the lift arm member to be releasably held in it. The lift arm member 22 is secured in socket portion 46 by one or more fastening members, such as turn screw member 48. This arrangement allows the lift arm member 22 to be removed from the system or structure 10 when it is not desired to carry a bicycle on the vehicle. The lift arm member can then be stored in the vehicle or stationary storage structure as desired. Similarly, the crank arm member 26 is adapted to be removable from the system 10 for storage when it is not being used.

The L-shaped bracket member 44 allows the bicycle to be positioned directly over the bracket members 36 when the lift arm member 22 is in its full upright position. The shape of the bracket member 44 also allows the wheels 32 and 34 of the bicycle 30 to be rotated over the upper portions of the bracket members 36 and then be lowered in position into the bracket members as the shaft member 20 is rotated into its final position.

Figure 5:
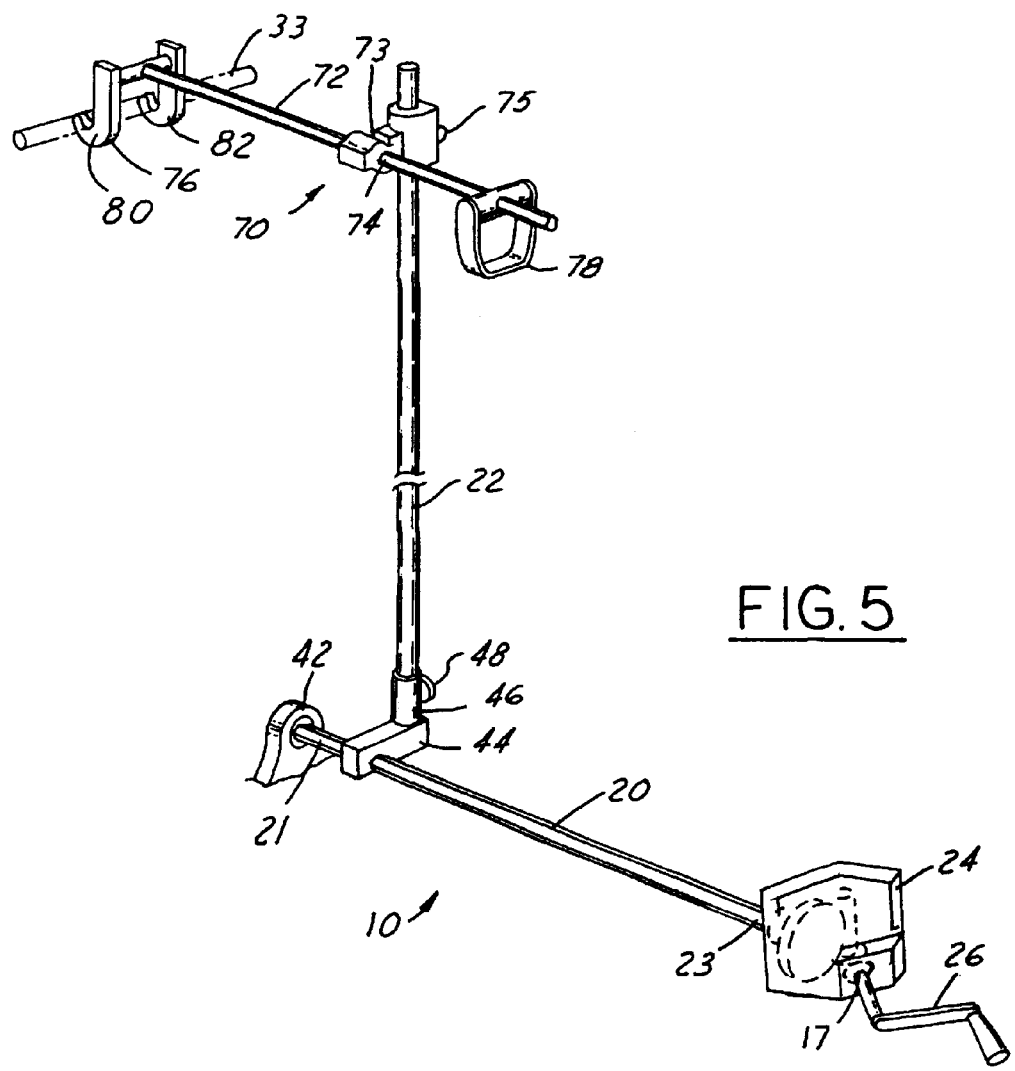
FIG. 5 is a perspective schematic view of a preferred embodiment of the lifting mechanism in accordance with the present invention.

One end, preferably the forward end 21 of the shaft member 20 is held in position by a bearing member 42 (see FIG. 5). The bearing member 42 can be of any conventional type and is adapted to rotatably hold end 21 of the shaft member 20 and allow it to be rotated by the crank member 26. The bearing member 42 can be attached to the rooftop carrier of the vehicle or be included as part of a total package or system for positioning on the roof of a vehicle, as described above.

Figure 7:
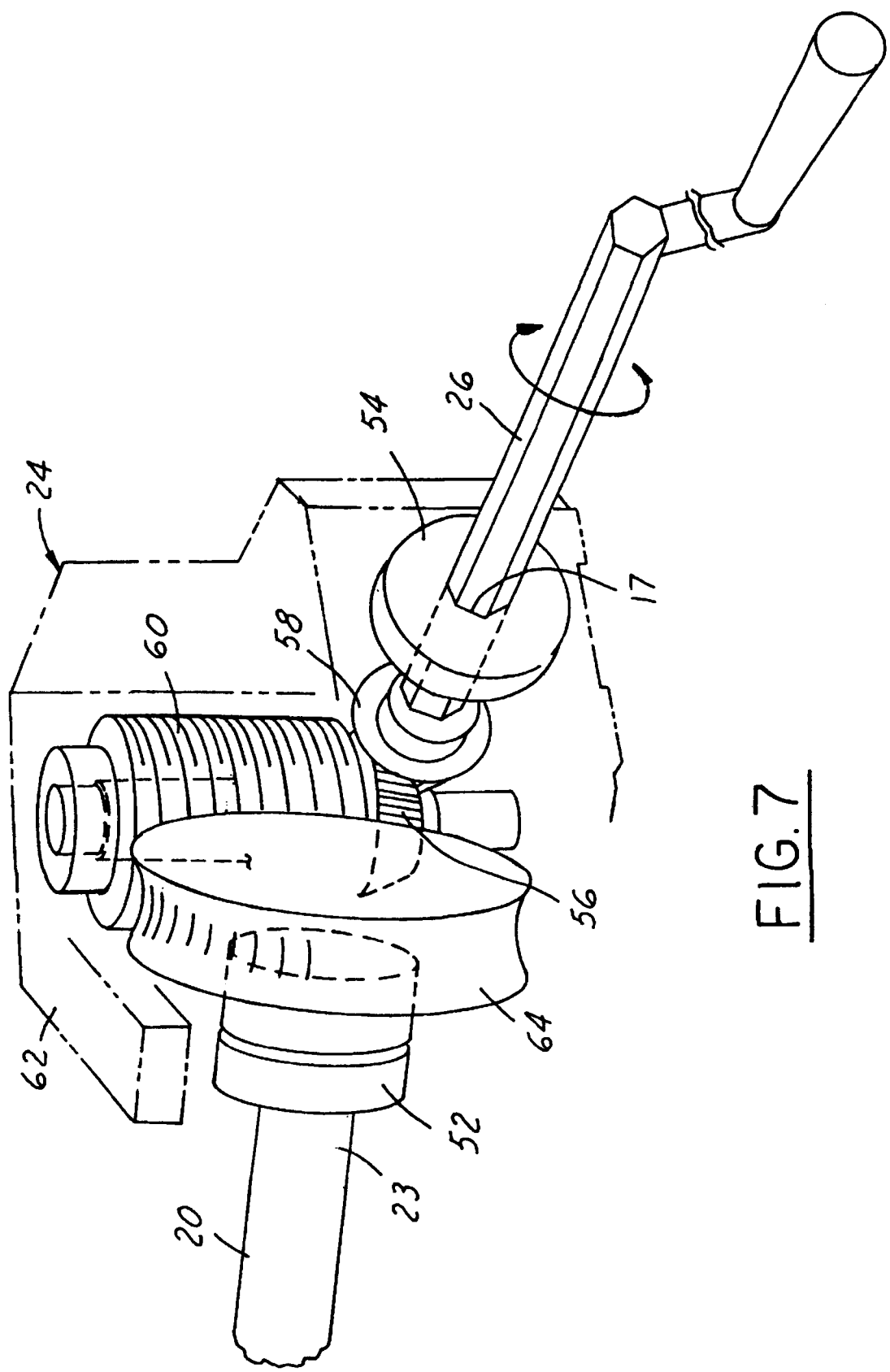
FIG. 7 schematically illustrates a preferred embodiment of a gear mechanism for use with the present invention.

The opposite end of the shaft member is connected to a gear mechanism 24. Preferably, in accordance with the present invention, the gear mechanism 24 comprises a reduction gear set which allows ease of rotation of the shaft member 20 and ease of movement of the bicycle from the ground to the roof of the vehicle and vice versa. In this regard, in the preferred embodiment, as shown in FIG. 7, the gear mechanism 24 includes a first socket member 52, a second socket member 54, a set of bevel gear members 56 and 58, and a worm gear member 60. The gear set is positioned in a housing 62 which is either separately included for attachment to the vehicle rooftop carrier or included as part of a rooftop accessory structure for the vehicle. The socket member 52 is adapted to be attached to end 23 of the shaft member 20, while the second socket member 54 is adapted for attachment to the crank arm member 26. As indicated above, it is also possible to provide a conventional motorized mechanism or system in order to rotate the shaft member. In this regard, any conventional type of motorized turning mechanism can be utilized and thus it is not believed necessary to describe it in detail herein.

Bevel gear member 56 is secured in the housing 62 and is operably associated with worm gear member 60. Worm gear member 60 in turn is operably associated with gear member 64 which in turn is attached to the socket member 52 for rotation therewith. Bevel gear member 58 is secured to socket member 54. In operation, rotation of socket member 54 by handle member 26 or a motorized mechanism (not shown) rotates bevel gear 58 which in turn rotates bevel gear 56 and the worm gear member 60. This in turn rotates gear member 64 which is attached to socket member 52 and thus in turn rotates shaft member 20. By appropriate gearing ratios, it is possible to provide a gear reduction mechanism 24 which allows ease of turning of the shaft member 20 and thus ease of lifting and lowering the bicycle 30 by the system 10 by any person. For example, one system utilizing the present invention had a gear reduction sufficient to allow a fifth percentile female to operate it and lift a 30 pound bicycle.

The use of a gear mechanism having a worm gear, such as worm gear 60, also provides additional security to prevent the shaft member from slipping or rotating backwards inadvertently. The worm gear mechanism essentially "locks" the shaft member 20 in its position as it is rotating. In this regard, if a worm gear is not provided, then it is recommended that an additional mechanism or structure be provided in order to hold the shaft member firmly in position at all times and prevent it from rotating or slipping when the bicycle is being raised or lowered. Such mechanisms are conventional and are known to persons or ordinary skill in the art.

The bicycle 34 is attached to the lift arm member 22 by a support mechanism 70. The support mechanism 70 is better shown in FIGS. 3–6. The support mechanism 70 includes a rod member 72, a bracket member 74, a handlebar supporting mechanism 76 and a seat supporting mechanism 78. The rod member 72 is attached to the support bracket 74 which in turn is adjustably attached to the lift arm member 22. In this regard, the support bracket 74 is adapted to be secured in position along the length of the lift arm member 22 by fastening member 75. Fastening member 75 has a threaded shaft which is manually releasable so that the bracket member 74 can be positioned along the length of the lift arm member 22. The rod member 72 is secured to the bracket member 74 by a connecting mechanism 73 which allows limited rotational movement of the rod member 72.

Figure 6:
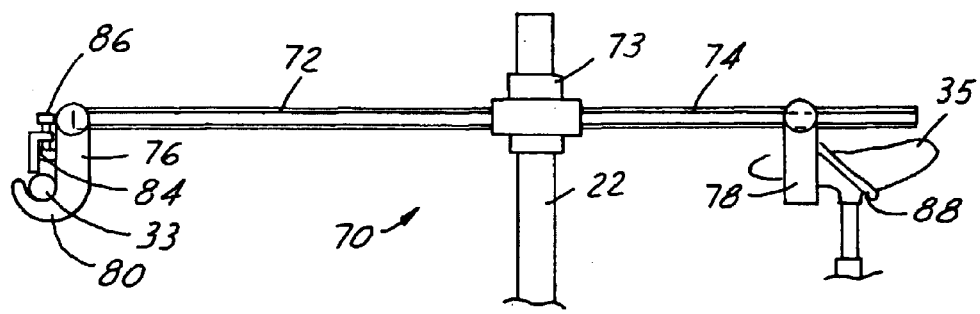
FIG. 6 illustrates a preferred holding and securing support structure for securing a bicycle on the lifting mechanism in accordance with the present invention.

Support member 76 contains a pair of J-shaped holder members 80 and 82 which are adapted to hold the handlebar 33 of the bicycle. A releasable locking member or mechanism 84 attached to the support member 76 and releasably held in position by fastening member 86 is used to releasably secure the handlebar 33 in position. This is shown in FIG. 6. The handlebar support member 76 can be fixedly secured to the rod member 72, or allowed to be longitudinally adjustable along the length of the rod member 72 in order to compensate for bicycles of various sizes and lengths.

The seat holding support member 78 comprises a stirrup-type member which is attached to the rod member 72. Similar to the adjustability of the handlebar support member 76, the support member 78 can be either fixedly secured to the rod member 72 or allowed to be adjustable along the length of the rod member 72 in order to accommodate bicycles of various sizes and lengths. As particularly shown in FIG. 6, the support member 78 is adapted to hold the seat 35 of the bicycle. The front or nose of the seat is positioned in the opening in the stirrup-shaped support member 78. A releasable strap member 88, such as a bungee cord or the like, is used to secure the seat 35 in position in the support member 78.

The connecting mechanism 73 also allows the rod member 72 to rotate relative to the lift arm member 22 in order to allow the support members 76 and 78, together with the bicycle 34, to always remain in a fixed vertically-oriented position. In this regard, the operation of the mechanism 73 is more particularly shown in FIGS. 3 and 4.

If necessary for clearance of the lift arm member 22 relative to the side of the vehicle 12, it is possible to provide a lift arm member with a bent or curved shape. This is shown in FIGS. 1 and 2 and referred to by the reference numeral 90.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A bicycle lifting and lowering system for a vehicle rooftop structure comprising:
   a rotatable shaft member having a first end and a second end;
   a lift arm member attached to said shaft member;
   a bicycle support mechanism attached to said lift arm member; and
   a gear mechanism connected to said shaft member;
   said gear mechanism being connected to said first end of said shaft member and further comprising a bushing member attached to said second end of said shaft
   wherein rotation of said shaft member rotates said lift arm member which in turn enables a bicycle to be lifted and lowered relative to the vehicle roof top structure.

2. The bicycle lifting and lowering system as described in claim 1 wherein said gear mechanism is a reduction gear mechanism.

3. The bicycle lifting and lowering system as described in claim 1 wherein said gear mechanism comprises at least a bevel gear member and a worm gear member.

4. The bicycle lifting and lowering system as described in claim 1 further comprising a hand crank member for operating said gear mechanism and in turn rotating said shaft member.

5. The bicycle lifting and lowering system as described in claim 1 wherein said bicycle support mechanism comprises a rod member, a handlebar support member and a seat support member.

6. The bicycle lifting and lowering system as described in claim 1 further comprising at least one bicycle wheel bracket member for securing said bicycle to the vehicle rooftop structure.

7. The bicycle lifting and lowering system as described in claim 1 wherein said lift arm member is releasably attached to said shaft member.

8. The bicycle lifting and lowering system as described in claim 1 further comprising an L-shaped bracket member for attaching said lift arm member to said shaft member.

9. The bicycle lifting and lowering system as described in claim 1 further comprising means for operating said gear mechanism and rotating said shaft member.

10. The bicycle lifting and lowering system as described in claim 9 wherein said means for rotating comprises a hand crank member.

11. The bicycle lifting and lowering system as described in claim 9 wherein said means for rotating comprises a motorized mechanism.

12. A carrier device for transporting a bicycle on a vehicle and for lifting and lowering the bicycle onto and from the vehicle rooftop, said carrier device comprising:
   a rack mechanism for receiving and securing a bicycle on the roof of a vehicle;
   a shaft member rotatably positioned in said rack mechanism, said shaft member having a first end and a second end;
   a bearing member in said rack mechanism for rotatably securing said first end of said shaft member;
   a gear mechanism in said rack mechanism and operably connected to said second end of said shaft member;
   means for operating said gear mechanism and rotating said shaft member;
   a lift arm member attached to said shaft member and rotatable therewith; and
   bicycle holding mechanism on said lift arm member for holding and securing a bicycle to said lift arm member.

13. A carrier device a described in claim 12 wherein said gear mechanism is a reduction gear mechanism.

14. A carrier device as described in claim 12 wherein said gear mechanism comprises at least one bevel gear member and worm gear member.

15. The carrier device as described in claim 12 wherein said means for operating said gear mechanism comprises a hand-crank member.

16. The carrier device as described in claim 12 wherein said means for operating said gear mechanism comprises a motorized mechanism.

17. The carrier device as described in claim 12 wherein said bicycle holding mechanism comprises a rod member connected to said lift arm member and a handlebar support member and seat support member attached to said rod member.

18. The carrier device as described in claim 12 wherein said lift arm member is releasably attached to said shaft member.

19. The carrier device as described in claim 12 further comprising an L-shaped bracket member for attaching said lift arm member to said shaft member.

20. A bicycle lifting and lowering system for a vehicle rooftop structure comprising:
- a rotatable shaft member having a first end and a second end;
- a lift aim member attached to said shaft member;
- a bicycle support mechanism attached to said lift arm member;
- a gear mechanism connected to said shaft member; and
- a hand crank member for operating said gear mechanism and in turn rotating said shaft member;
- wherein rotation of said shaft member rotates said lift arm member which in turn enables a bicycle to be lifted and lowered relative to the vehicle roof top structure.

21. A bicycle lifting and lowering system for a vehicle rooftop structure comprising:
- a rotatable shaft member having a first end and a second end;
- a lift arm member attached to said shaft member;
- a bicycle support mechanism attached to said lift arm member, said bicycle support mechanism comprising a rod member, a handlebar support member and a seat support member; and
- a gear mechanism connected to said shaft member;
- wherein rotation of said shaft member rotates said lift arm member which in turn enables a bicycle to be lifted and lowered relative to the vehicle roof top structure.

* * * * *